United States Patent [19]

Furr

[11] 4,129,627
[45] Dec. 12, 1978

[54] TORNADO PROTECTED COOLING TOWER

[75] Inventor: Dale D. Furr, Fort Worth, Tex.

[73] Assignee: Ceramic Cooling Tower Company, Fort Worth, Tex.

[21] Appl. No.: 822,078

[22] Filed: Aug. 5, 1977

[51] Int. Cl.² .................................................. B01F 3/04
[52] U.S. Cl. ...................................... 261/151; 261/24; 261/109; 261/DIG. 11
[58] Field of Search ................. 261/24, 109, 111, 151, 261/DIG. 11, DIG. 77; 165/DIG. 1; 55/257 R

[56] References Cited

U.S. PATENT DOCUMENTS

| | | | |
|---|---|---|---|
| 2,809,817 | 10/1957 | Munters | 261/DIG. 11 |
| 3,243,166 | 3/1966 | Osenga et al. | 261/DIG. 11 |
| 3,363,885 | 1/1968 | Meek | 261/DIG. 11 |
| 3,749,379 | 7/1973 | Brown | 261/DIG. 11 |
| 3,791,634 | 2/1974 | Phelps | 261/DIG. 11 |
| 3,870,485 | 3/1975 | Shiraishi et al. | 261/DIG. 11 |
| 3,944,636 | 3/1976 | Schuldenberg et al. | 261/109 X |
| 4,022,853 | 5/1977 | Schulenberg | 261/DIG. 77 |

Primary Examiner—Richard L. Chiesa
Attorney, Agent, or Firm—Tilton, Fallon, Lungmus & Chestnut

[57] ABSTRACT

A tornado protected cooling tower. The tower includes a plurality of enclosed cooling cells arranged about the periphery of an open cooling basin. Each of the cells includes a cool air inlet along the side thereof opposite the open cooling basin and a warm air outlet along the side thereof adjacent the open cooling basin. A plurality of fans are mounted within each of the cells along the side thereof adjacent the open cooling basin in direct communication with the warm air outlet. Each of the cells further includes an inner wall having an apron portion extending downwardly below the lowest component of the fans. Water distribution means is provided for carrying water upwardly from the open cooling basin into each of the cells for discharge in uniformly dispersed fashion within the cell. Each of the cells includes a perforate fill material supported by fill support means below the water distribution means and above the cool air inlet. A covered collecting basin is provided within each of the cells below the water distribution system, perforate fill, fill support means, and cool air inlet. With these features, the fans draw cool air into the cool air inlets upward through the perforate fill material for discharge out the warm air outlets and the water distribution means carry water from the open cooling basin upward into the cells for discharge above the perforate fill material, the water showering downwardly through the perforate fill material into the collecting basins, the air flowing upwardly through the perforate fill material to cool the downwardly showering water.

21 Claims, 10 Drawing Figures

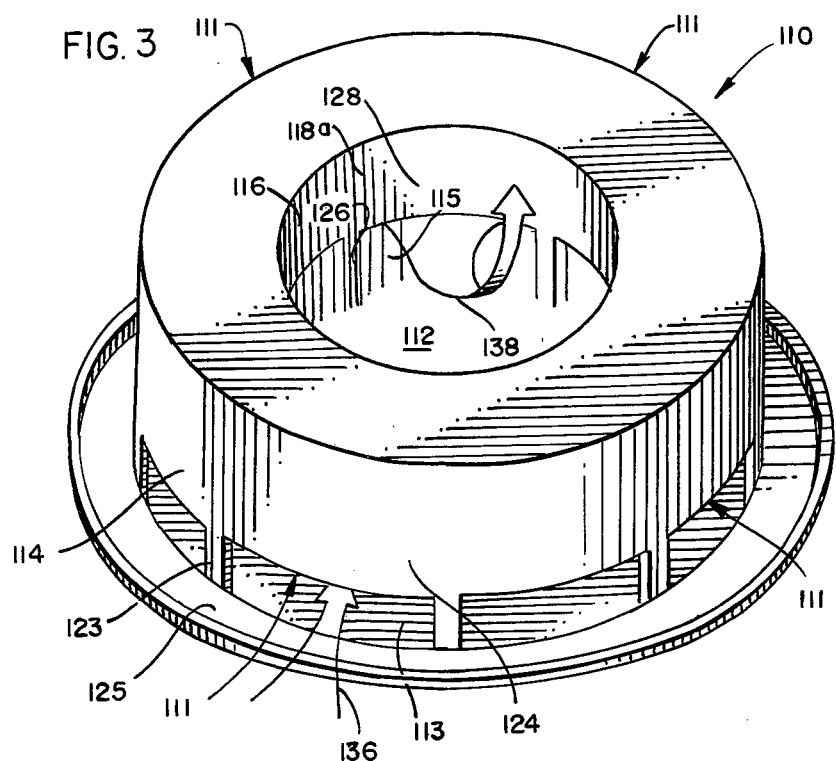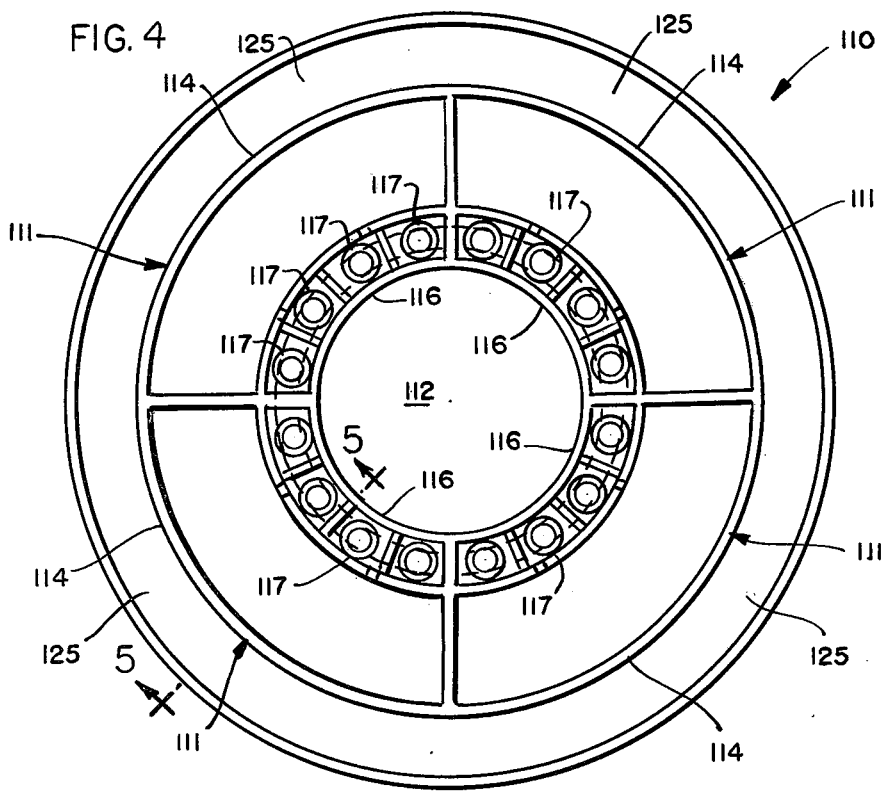

TORNADO PROTECTED COOLING TOWER

BACKGROUND

The present invention relates to cooling towers and, more particularly, to tornado protected cooling towers.

Cooling towers are used for many purposes including cooling systems for nuclear power plants. It is always desirable for cooling towers to be protected so as to preclude damage from natural phenomena such as tornadoes. This is not only desirable where the cooling tower is used to cool a reactor in a nuclear power plant, but is also critical to assure safety being a regulation of the U.S. Nuclear Regulatory Commission. The regulations initially required protection against only horizontally generated missiles which conventional cooling towers could easily meet. However, cooling towers are now required to preclude damage from vertically generated missiles as well in order to more nearly assure safety by precluding damage from the effects of natural phenomena such as tornadoes.

Conventional cooling towers simply do not comply with the new missile protection regulations. It has been commonplace in the past for the fan stack to be located at the top of the cooling tower for upward vertical discharge. This has meant that the fan and fan drive equipment have been exposed to vertically generated missiles without protection of any kind. It has also meant that such missiles could enter the cooling tower through the fan stack causing damage to drift eliminators, the water distribution system, and perforate fill material. Without providing a protective cover supported by a beam structure over the top of the cooling tower, it has been difficult if not impossible to meet the regulations of the U.S. Nuclear Regulatory Commission but such protective covering for conventional cooling towers has proven to add considerable expense to the over-all system.

The regulations require structures, systems, and components important to the safety of nuclear power plants to be designed to withstand the effects of natural phenomena such as tornadoes without loss of capability to perform their safety functions. It is important for the plants to be designed so that they can be placed and maintained in a safe shut-down condition in the event of the most severe tornado that can reasonably be predicted to occur at a sight as a result of severe meteorological conditions. Protection of structures, systems, and components includes those portions of the long term emergency core cooling systems such as the cooling tower that would be required to maintain the plant in a safe condition for an extended time after a loss of coolant accident. It is imperative that the plant be protected sufficiently so that it can be placed and maintained in a cold shut-down condition generally by designing protective barriers of a type capable of precluding damage from most missile strikes. However, persons skilled in the art of cooling towers have been left with the task of developing either modifications of existing cooling towers or entirely new cooling towers capable of meeting the regulations while at the same time providing efficient, effective, and reliable operation.

While those skilled in the art have generally concentrated on providing a protective cover supported by a beam structure over a conventional cooling tower, the present invention represents a substantial departure in an entirely new cooling tower concept that not only meets government regulations for nuclear power plants but also represents an improvement over conventional cooling towers by eliminating a number of problems heretofore associated with them.

SUMMARY

The present invention is directed to a tornado missile protected cooling tower. The cooling tower includes a plurality of enclosed cooling cells arranged about the periphery of an open cooling basin. Each of the cells includes a cool air inlet along the side thereof opposite the open cooling basin and a warm air outlet along the side thereof adjacent the open cooling basin. A plurality of fans are mounted within each of the cells along the side thereof adjacent the open cooling basin in direct communication with the warm air outlet. Each of the cells also includes an inner wall having an apron portion extending downwardly below the lowest component of the fans. Water distribution means are provided for carrying water upwardly from the open cooling basin into each of cells for discharge in uniformly dispersed fashion within the cell. Each of the cells includes a perforate fill material supported by fill support means below the water distribution means and above the cool air inlet. A covered collecting basin is provided within each of the cells below the water distribution system, perforate fill material, fill support means, and cool air inlet. With these features the tornado missile protected cooling tower is highly efficient, effective and reliable in operation.

With the construction outlined, the fans draw cool air into the cool air inlets upward through the perforate fill material for discharge out the warm air outlet and the water distribution means carry water from the open cooling basin upward into the cells for discharge above the perforate fill material. The water showers downwardly through the perforate fill material into the collecting basins and the air flows upwardly through the perforate fill material to cool the downwardly showering water. Counter flow of the air and water as well as the break-up of the water by the water distribution means and perforate fill material permits a high level of heat exchange to take place within the cooling tower.

In a preferred embodiment, the fans are mounted vertically within each of the cells adjacent the apron portion of the inner wall. The apron portion is horizontally offset outwardly from the remaining portion of the inner wall and the wall portions are disposed in vertically overlapping relation. The fans are mounted within each of the cells so as to be supported between the apron portion and the remaining portion of the inner wall.

The cool air inlet and the warm air outlet of each of the cells are horizontally elongated openings on opposite sides thereof extending across the lower portions of each of the cells. The fans are mounted within each of the cells to draw air in through the cool air inlet and to discharge air downwardly and outwardly through the warm air outlet. With the fans so mounted, they cause moisture in the discharged air to return to the open cooling basin without need for drift eliminators.

The fans are preferably self-contained vane axial fans having motors as integral components utilizing direct drive. It is also possible for the fans to be propeller type fans having motors operatively connected to the fans for driving the propellers in conventional fashion. The open cooling basin is preferably square defining a central opening to the surrounding atmosphere to carry away air discharged through the warm air outlets although it is also possible for it to be circular, rectangular, or in other desired shapes. It is desirable for the cells to extend completely around so as to enclose the periphery of the open cooling basin.

The water distribution means is a main pipe leading from the open cooling basin through the heat source heat exchangers and then into each of the cells terminating in a series of uniformly spaced laterally extending feed pipes having spray nozzles evenly disposed along their lengths. The perforate fill material located beneath the water distribution means is preferably ceramic tiles having a cellular structure arranged vertically in layers in offset fashion so that the water showers downwardly through the material rather than flowing directly therethrough. The fill support means can be conventional such as a reinforced concrete framework of columns and beams with lintels spanning the beams to support the perforate fill material.

The present invention is therefore directed to a tornado missile protected cooling tower. It is an object of the present invention to provide such a tower in which the fans, water distribution means, and perforate fill material are all confined and protected within enclosed cooling cells. Other objects and advantages of the present invention will be apparent from consideration of the details of construction and operation set forth in the accompanying specification, claims and drawings.

DRAWINGS

The present invention is described in conjunction with the accompanying drawings, in which —

FIG. 3 is a perspective view of another embodiment of a tornado missile protected cooling tower in accordance with the present invention;

FIG. 4 is a cross-sectional view taken above the fans of the cooling tower of FIG. 3;

DESCRIPTION

Figure 1:
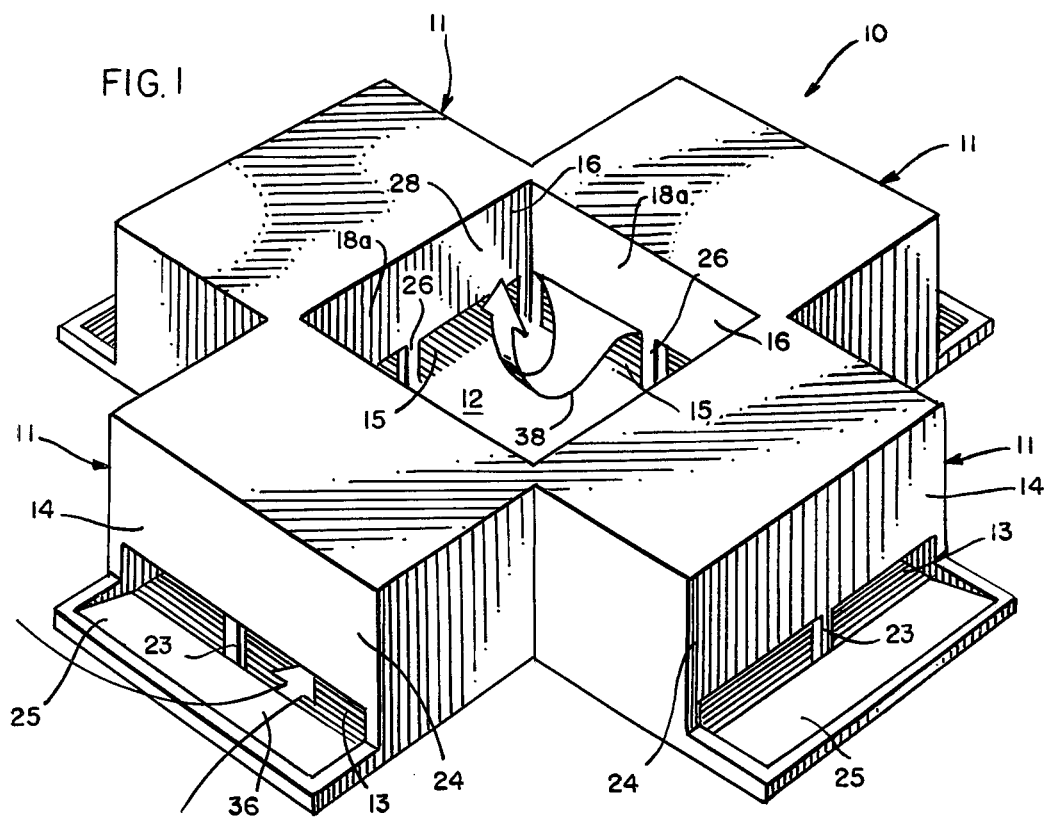
FIG. 1 is a perspective view of a tornado missile protected cooling tower in accordance with the present invention.
Figure 2:
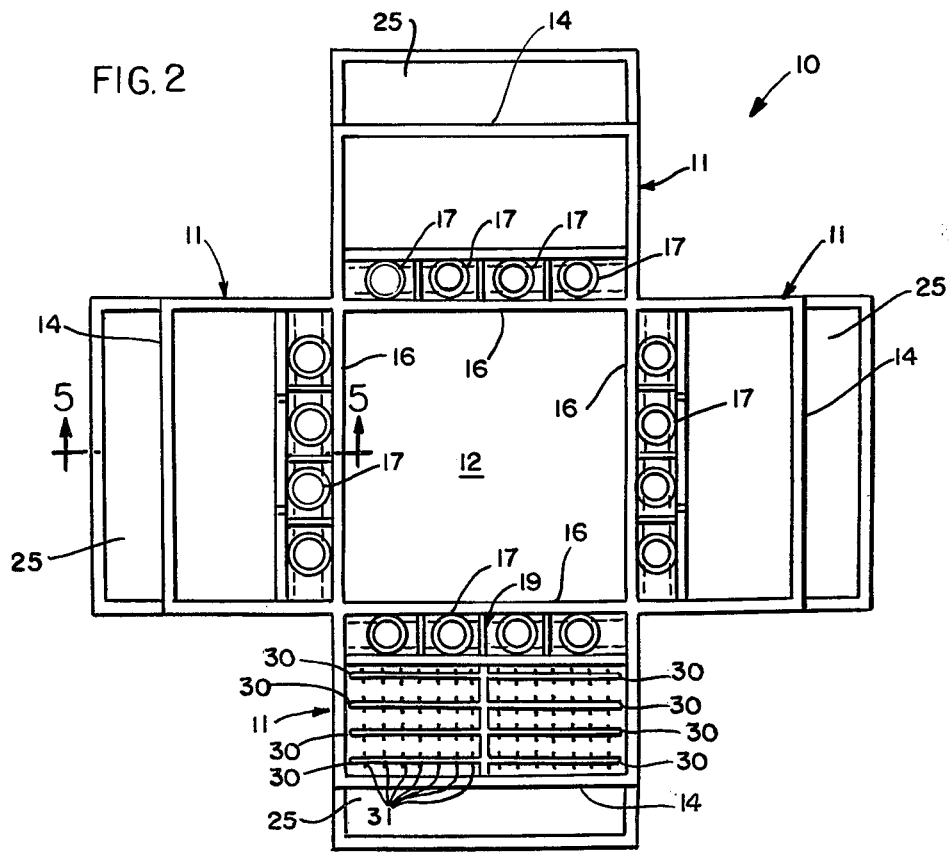
FIG. 2 is a cross-sectional view taken above the fans of the cooling tower of FIG. 1 (with only one cell of the tower in full detail)
Figure 5:
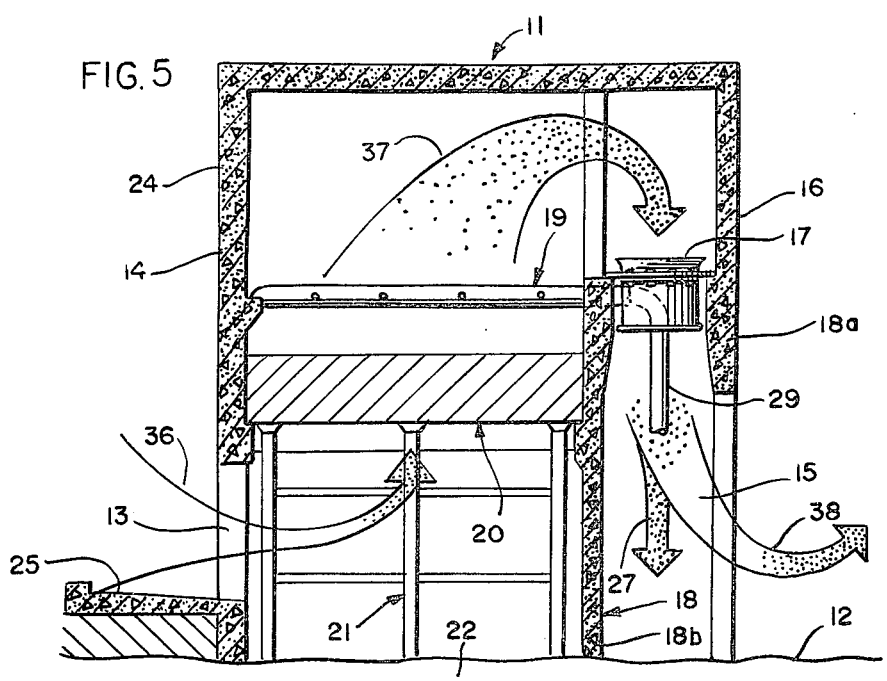
FIG. 5 is a cross-sectional view taken on the lines 5—5 of either FIG. 2 or FIG. 4.
Figure 7:
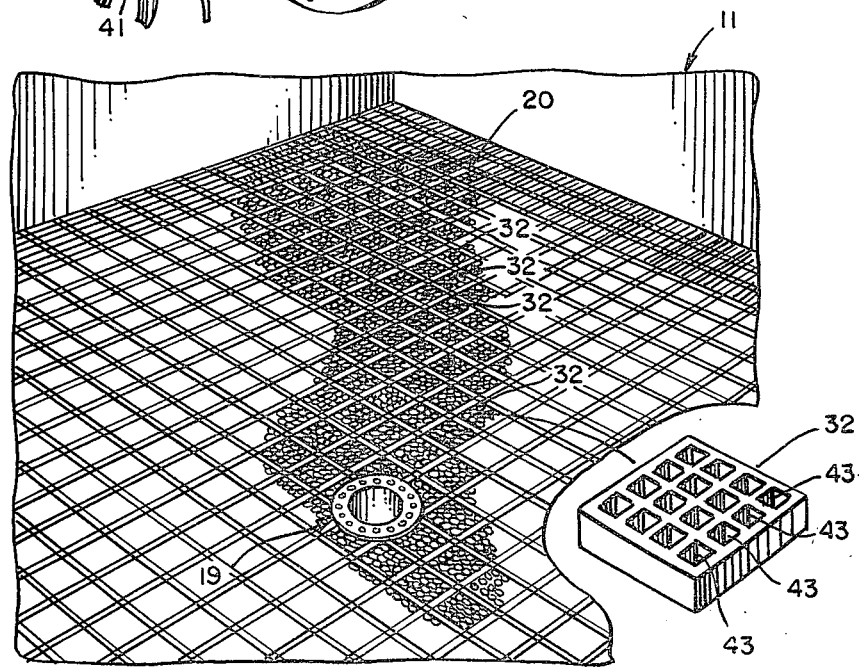
FIG. 7 is a perspective view illustrating a perforate fill material utilized in the tornado missile protected cooling tower of the present invention.
Figure 9:
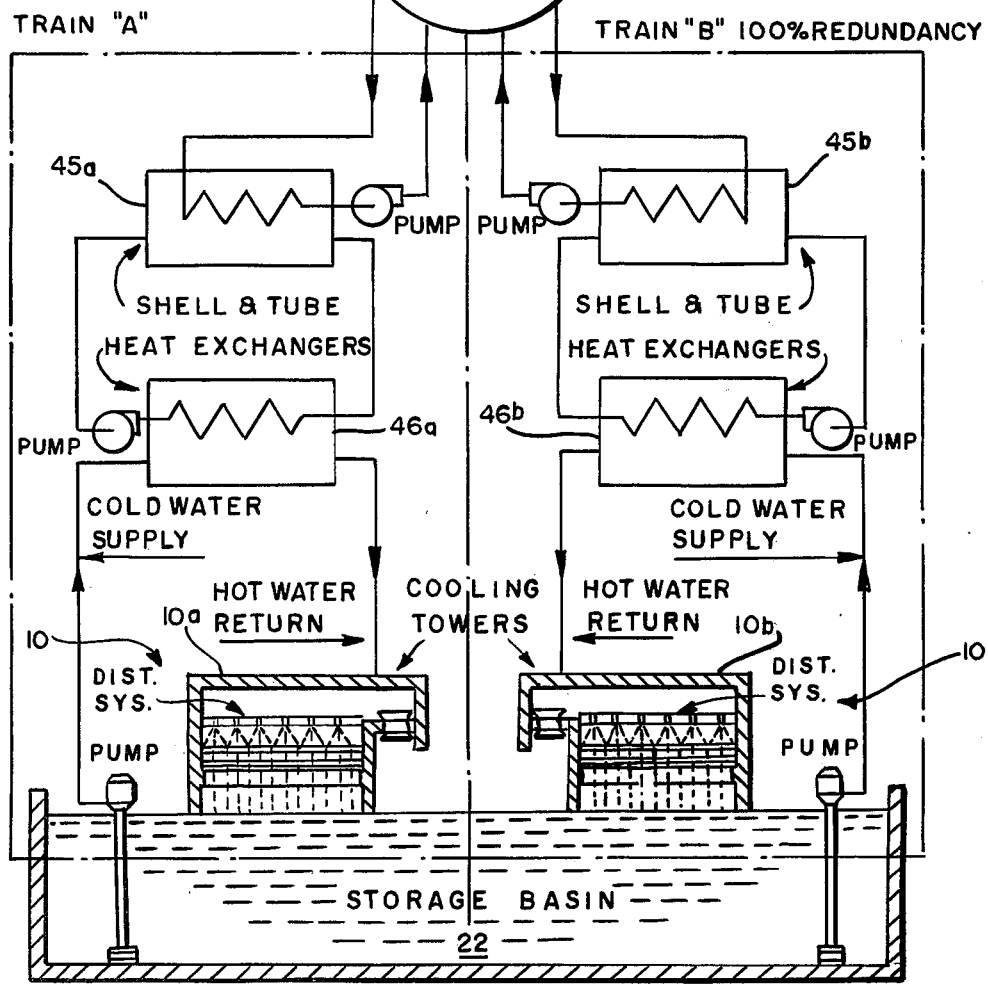
FIG. 9 is a schematic diagrammatic view illustrating the tornado missile protected tower being utilized to cool a reactor of a nuclear power plant.

In the illustration given and with reference first to FIG. 1, the numeral 10 designates generally a tornado missile protected cooling tower in accordance with the present invention. The cooling tower 10 includes a plurality of enclosed cooling cells 11 arranged about the periphery of a central opening 12. Each of the cells 11 includes a cool air inlet 13 (as shown in FIG. 1) along the side 14 thereof opposite the central opening 12 and a warm air outlet 15 along the side 16 thereof adjacent the central opening 12. A plurality of fans 17 (as shown in FIG. 2) are mounted within each of the cells 11 along the side 16 thereof adjacent the central opening 12 in direct communication with the warm air outlet 15 (as shown in FIG. 5). Each of the cells 11 also includes an inner wall 18 (as shown in FIG. 5) having an apron portion 18a extending downwardly below the lowest component of the fans 17. Water distribution means 19 (as shown in FIG. 5) is provided for carrying water from the storage basin 22 through the heat source heat exchangers 46a and 46b (as shown in FIG. 9) then into each of the cells 11 for discharge in uniformly dispersed fashion within the cell 11 (as shown in FIGS. 2 and 9). Each of the cells 11 includes a perforate fill material 20 (as shown in FIG. 7) supported by fill support means 21 below the water distribution means 19 and above the cool air inlet 13. A storage basin 22 extends beneath each of the cells 11 below the water distribution means 19, perforate fill material 20, fill support means 21 and cool air inlet 13. With these features, the fans 17 draw cool air into the cool air inlets 13 upward through the perforate fill material 20 for discharge out the warm air outlets 15 and the water distribution means 19 carry water from the storage basin 22 through the heat source heat exchangers 46a and 46b then into the cells 11 for discharge above the perforate fill material 20, the water showering downwardly through the perforate fill material 20 again into the storage basin 22, the air flowing upwardly through the perforate fill material 20 to cool the downwardly showering water.

Figure 10:
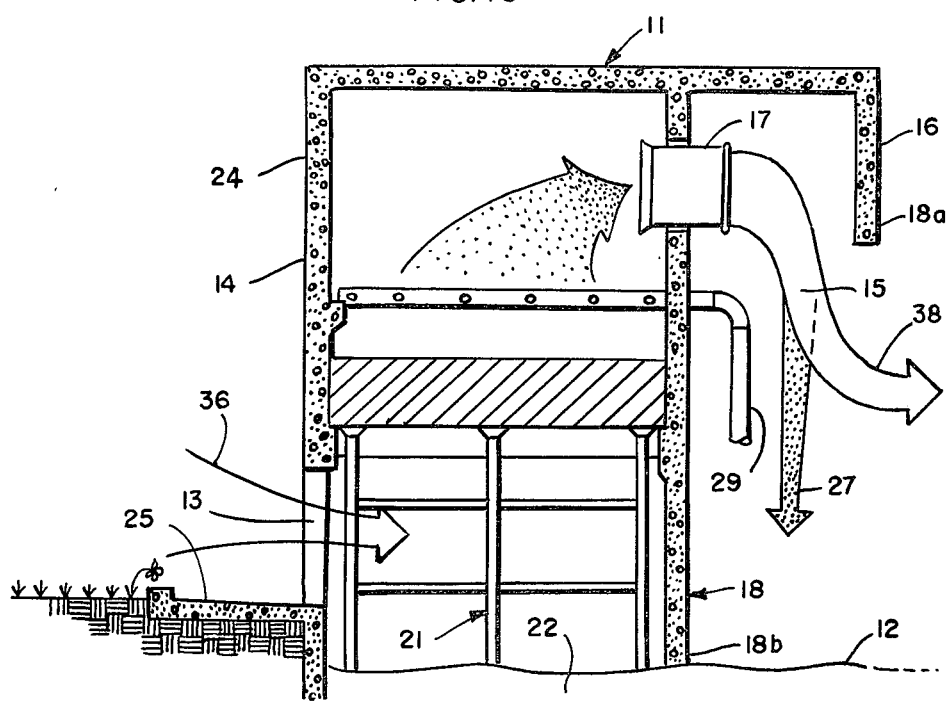
FIG. 10 is a cross-sectional view similar to FIG. 5 illustrating an alternative fan embodiment for a tornado missile protected cooling tower in accordance with the present invention.

The fans 17 are preferably mounted vertically (as shown in FIG. 5) within each of the cells 11 so as to be supported between the apron portion 18a and the remaining portion 18b of the inner wall 18. Referring to FIG. 10, it will be seen that the fans 17 can also be mounted horizontally within each of the cells 11 so as to be supported between the apron portion 18a and the remaining portion 18b by extending through the remaining portion 18b of the inner wall 18. It will be seen that the apron portion 18a is horizontally offset outwardly from the remaining portion 18b of the inner wall 18 and the wall portions 18a and 18b are disposed in vertically overlapping relation.

The cool air inlet 13 of each of the cells 11 (as shown in FIG. 1) is a horizontally elongated opening. The horizontally elongated opening 13 extends across the lower portion of each of the cells 11 and may be interrupted along its length as at 23 for vertical support of the outer wall 24. It is desirable to provide a splash apron 25 along the side 14 of each of the cells 11 opposite the central opening 12. The horizontally elongated opening 13 extends downwardly to the base of the splash apron 25 so that the storage basin 22 is in communication therewith. The cool air inlet 13 therefore also acts as a passageway for water into the splash apron 25 in the event that water splash from the storage basin 22 rises above a certain level.

The warm air outlet 15 of each of the cells 11 (as shown in FIG. 1) is also a horizontally elongated opening. The horizontally elongated opening 15 similarly extends across the lower portion of each of the cells 11 and similarly may be interrupted along its length as at 26 to provide vertical support for the apron portion 18a of the inner wall 18. The warm air outlet 15 extends downwardly to the surface of the water in the storage basin 22.

As will be appreciated from FIG. 5, the fans 17 are preferably mounted within each of the cells 11 to discharge air outwardly through the warm air outlet 15. The fans develop an air flow pattern which allows moisture in the discharged air (as represented by arrow 27) to return to the storage basin 22 with or without drift eliminators. In conventional cooling towers, drift eliminators are needed because mist entrainment in the air would otherwise permit moisture to be removed from the cooling tower system which is not only undesirable from the point of view of conserving water but is also environmentally harmful because of the usual chemically laden nature of the water. The fans 17 are preferably self-contained vane axial fans having motors as integral components utilizing direct drive. However, the fans can also be propeller type fans having motors operatively connected to the fans in any conventional fashion for driving the propellers.

Referring to FIG. 1, the open portion of the storage basin 22 is square defining the central opening 12 to the surrounding atmosphere to carry away air discharged through the warm air outlets 15. The warm air outlets 15 are positioned relative to the central opening 12 so that discharged air will not be recirculated through the cool air inlets 13. The storage basin 122 (as shown in FIG. 3) is circular defining a central opening 128 to the surrounding atmosphere to carry away air discharged through the warm air outlets 115.

Figure 8:
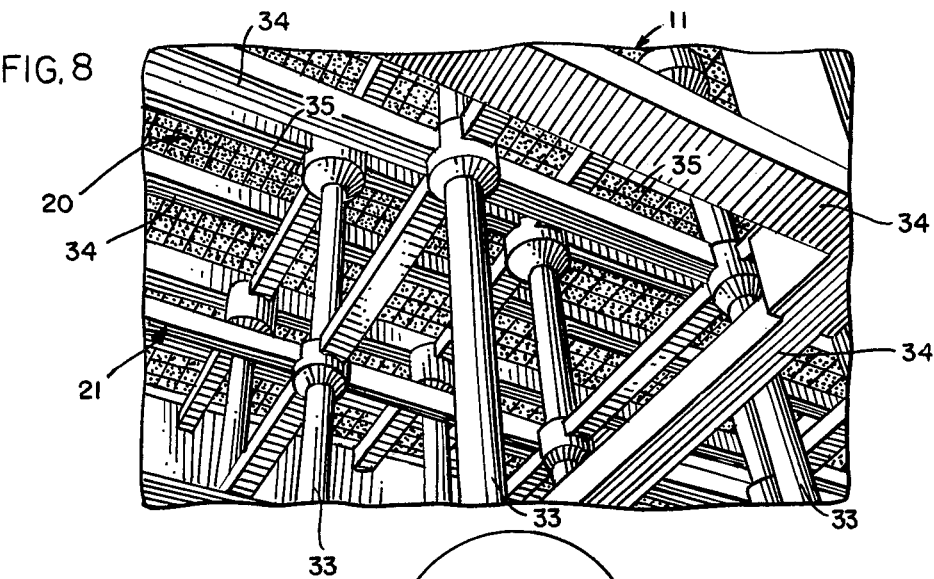
FIG. 8 is a perspective view illustrating a fill support means utilized in the tornado missile protected cooling tower of the present invention.

With either the square embodiment 10 or circular embodiment 110 (or other possible geometric shapes) the cells 11, 111, etc. extend completely around so as to enclose the periphery of the central opening 12, 112, etc. The water distribution means 19 (as shown in FIG. 5) is a main pipe 29 leading from the storage basin 22 through the heat source heat exchangers 46a and 46b into each of the cells 11 terminating in a series of uniformly spaced laterally extending feed pipes 30 (as shown in FIG. 2) having spray nozzles 31 evenly disposed along their lengths for discharge of water within each of the cells in uniformly dispersed fashion. The perforate fill material 20 (as shown in FIG. 7) is ceramic tiles 32 having a multicellular structure arranged vertically in layers in offset fashion so that water showers downwardly through the material 20 rather than flowing directly therethrough with the fill support means 21 (as shown in FIG. 8) including a reinforced concrete framework of columns 33 and beams 34 with lintels 36 spanning the beams 34 to support the perforate fill material 20. While all of these details of construction have been described primarily with respect to the embodiment of FIG. 1, it will readily be understood that the details remain unchanged with respect to the embodiment of FIG. 3 or other possible embodiments except for conformity to the specific geometric configuration.

Referring to FIG. 5, the operation of the cooling tower 10 can be better understood. The water distribution means 19 is used to distribute water through the storage basin 22 through the heat source heat exchangers 46a and 46b then through a main pipe 29 into each of the cells 11 for distribution through the uniformly spaced laterally extending feed pipes 30. The water is discharged in uniformly dispersed fashion through the spray nozzles 31 evenly disposed along the lengths of the feed pipes 30. The water then showers downwardly through the multicellular structure of the ceramic tiles 32 that constitute the perforate fill material 20. The water is again collected in the storage basin 22 to complete its path of travel through the cell 11.

While the water is flowing through the cell 11 in the manner described, a counter-flow of cool air is flowing through the cell 11 in the opposite direction. The cool air inlet 13 admits air into the cell 11 from the surrounding atmosphere. The air is drawn by the fans 17 through the cool air inlet 13 (as shown by arrow 36) upwardly through the multicellular structure of the ceramic tiles 32 that form the perforate fill material 20. The air flowing upwardly passes through the water showering downwardly absorbing heat from the water as it flows and the air becomes moisture laden particularly after it has reached a point above the water distribution means 19 (as shown by arrow 37) just prior to entering the fans 17. The air at this point is discharged by the fans 17 in a warm and moisture laden condition in a downward and outward direction (as shown by arrow 38) with the entrained moisture returning to the storage basin 22. By utilizing the fans 17, there is no need for drift eliminators interposed between the water distribution means 19 and the fans 17 (although they can be used as in conventional systems) because the much heavier moisture settles out of the warm air to return to the open cooling basin 12.

Figure 6:
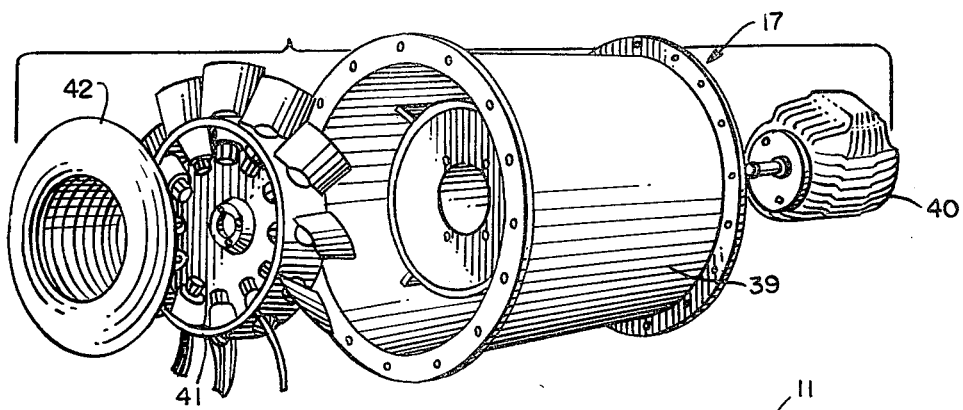
FIG. 6 is an exploded perspective view of a vane axial fan utilized in the tornado missile protected cooling tower of the present invention.

Referring to FIGS. 6, 7, and 8, additional details of the preferred embodiment of the invention can be understood. The fan 17 (as shown in FIG. 6) is preferably a self-contained unit. It includes a casing 39 containing a direct drive motor 40, hub and blades 41, and a nose piece 42. It has been found that axial vane fans of this type provide high performance with the fan arrangement discharging air vertically downwardly into the open cooling basin 12. The fan 17 is arranged and operates in a manner contributing to the absence of a need for drift eliminators. However, propeller type fans can be used if desired.

The ceramic tiles 32 forming the perforate fill material 20 in the preferred embodiment are clearly illustrated in FIG. 7. It will be seen that each of the tiles 32 have a number of individual cells 43 to form its multicellular structure. The tile 32 illustrated each have 16 cells (as shown in the enlargement) although the number, arrangement and size of the cells can obviously be varied depending upon the requirements of a particular application. It has been found that the ceramic tiles 32 are particularly effective because they are virtually indestructible and are impervious to normal cooling tower deterioration problems. However, the present invention is not limited to ceramic tiles since the overall design concept can be utilized with other fill material if desired.

Referring to FIG. 9, the cooling tower 10 is shown as a portion of a reactor cooling system in a schematic illustrating a typical nuclear power plant. The power plant includes a reactor 44 to be cooled by the cooling towers 10. The reactor 44 is coupled to two sets of cooling towers 10 to provide 100% redundancy for maximum protection. The water used to cool the reactor flows through shell and tube heat exchangers 45a, 45b transferring heat to heat exchangers 46a, 46b which in turn transfer heat to the cooling towers 10a and 10b. The cooling towers 10a and 10b cool the hot water from heat exchangers 46a and 46b in the manner described above thereafter returning it to the storage basin 22. While the use of the cooling tower 10 to cool a reactor 44 has been described referring to a schematic representation, those skilled in the art will readily appreciate the manner of connecting the cooling towers 10a, 10b to the reactor 44 through shell and tube heat exchangers 45a, 45b and 46a, 46b by means of pumps, pipes, etc.

In its most basic form, the tornado missile protected cooling tower 10 can include a single enclosed cooling cell 11. The cell 11 will have a cool air inlet 13 along one side 14 thereof and a warm air outlet 15 along the other side 16 thereof. A plurality of fans 17 will be mounted within the cell 11 along the side 16 thereof having the warm air outlet 15 and in direct communication therewith. The cell 11 will have an inner wall 18 with an apron portion 18a extending downwardly below the lowest component of the fans 17. Water distribution means 19 will be provided for carrying water into the cell 11 for discharge in uniformly dispersed fashion within the cell 11. The cell 11 will have a perforate fill material 20 supported by fill support means 21 below the water distribution means 19 and above the cool air inlet 13. A storage basin 22 will be provided beneath the cell 11 below the water distribution means 19, perforate fill material 20, fill support means 21, and cool air inlet 13. With a single enclosed cooling cell 11 or a plurality of cells 11 arranged in line, the fans 17 will draw cool air into the cool air inlet 13 upward through the perforate fill material 20 for discharge out the warm air outlet 15 and the water distribution means 19 will carry water from the storage basin 22 into the cell 11 for discharge above the perforate fill material 20, the water showering downwardly through the perforate fill material 20 again into the storage basin 22, the air flowing upwardly through the perforate fill material 20 to cool the downwardly showering water.

With the present invention, a cooling tower is provided with the cells arranged so as to preclude damage from tornado generated missiles or missiles generated by other natural phenomena. The arrangement can utilize vane axial fans which are well suited for location in protected areas. The cooling tower protects against both horizontal and vertical missiles which are both required by U.S. Nuclear Regulatory Commission standards. The arrangement accomplishes this objective without the need for any cover or maze over the central opening 12 immediately above the storage basin 22. Additionally, the cooling tower can have the cells arranged around a square, circular, rectangular, or other geometric periphery so as to accomodate most any design criteria.

With the fans mounted vertically or horizontally within the cells, mist eliminators are no longer needed since drift is directed into the storage basin. It has been found that vane axial fans of the turbine type have short blades operating at high r.p.m. are well suited to accomplish this objective. The air being drawn through the cell by the fans passes directly from the perforate fill material to the fans and the fans are self-contained having a motor as an integral part of the fan unit with direct drive. It has been found that vane axial fans are well suited for mounting between the apron portion of the inner wall and the remaining wall portion where they are well protected. Moreover, the cooling tower of the present invention having all of the features described not only complies with all present government regulations for nuclear power plant applications, but also provides a highly effective, efficient and reliable operation for any cooling application.

While in the foregoing specification a detailed description of the invention has been set forth for purposes of illustration, the details herein given may be varied by those skilled in the art without departing from the spirit and scope of the invention.

I claim:

1. In a tornado protected cooling tower including a plurality of enclosed cooling cells arranged about the periphery of a central opening, each of said cells having a cool air inlet along the outer side thereof opposite said central opening and a warm air outlet along the inner side thereof adjacent said central opening, fan means mounted within said cells, said cells also having a perforate fill material supported therein above said cool air inlet, and water distribution means within said cells above said fill material for applying cooling water thereto to shower downwardly therethrough, and storage basin means beneath such cells for receiving the water discharged therefrom, the improvement comprising providing a plurality of fans mounted within each of said cells along the inner side thereof adjacent said central opening in direct communication with said warm air outlet, said fans being self-contained vane axial fans having motors as integral components utilizing direct drive, providing each of said cells with inner wall means having an upper apron portion extending downwardly below the lowest component of said fans, said apron portion being horizontally offset inwardly from the remaining portion of said inner wall means and being disposed in generally vertically overlapping relation with respect thereto, and said fans being mounted vertically within each of said cells so as to be supported between said apron portion and the remaining portion of said inner wall.

2. A tornado protected cooling tower comprising a plurality of enclosed cooling cells arranged about the periphery of a central opening, each of said cells including a cool air inlet along the outer side thereof opposite said central opening and a warm air outlet along the inner side thereof adjacent said central opening, a plurality of fans mounted within each of said cells along the inner side thereof adjacent said central opening in direct communication with said warm air outlet, each of said cells including inner wall means providing an upper apron portion extending downwardly below the lowest component of said fans, said apron portion being horizontally offset inwardly from the remaining portion of said inner wall means and being disposed in generally vertically overlapping relation with respect thereto, water distribution means for carrying water into each of said cells for discharge in uniformly dispersed fashion within said cell, each of said cells including a perforate fill material supported by fill support means below said water distribution means and above said cool air inlet, and a storage basin beneath said cells below said water distribution means, perforate fill material, fill support means, and cool air inlet, whereby said fans draw cool air into said cool air inlets upward through said perforate fill material for discharge out said warm air outlets and said water distribution means carry water into said cells for discharge above said perforate fill material, said water showering downwardly through said perforate fill material into said storage basin, said air flowing upwardly through said perforate fill material to cool said downwardly showering water.

3. The cooling tower of claim 2 in which said fans are mounted vertically within each of said cells adjacent said apron portion of said inner wall.

4. The cooling tower of claim 2 in which said fans are mounted vertically within each of said cells so as to be supported between said apron portion and the remaining portion of said inner wall.

5. The cooling tower of claim 2 in which said cool air inlet of each of said cells is a horizontally elongated opening.

6. The cooling tower of claim 5 in which said horizontally elongated opening extends across the lower portion of each of said cells.

7. The cooling tower of claim 2 in which said warm air outlet of each of said cells is a horizontally elongated opening.

8. The cooling tower of claim 7 in which said horizontally elongated opening extends across the lower portion of each of said cells.

9. The cooling tower of claim 2 in which said fans are mounted within each of said cells to discharge air outward through said warm air outlet.

10. The cooling tower of claim 9 in which said fans develop an air flow pattern which allows moisture in said discharged air to return to said open cooling basin without need for drift eliminators.

11. The cooling tower of claim 2 in which said fans are self-contained vane axial fans having motors as integral components utilizing direct drive.

12. The cooling tower of claim 2 in which said fans are propeller type fans having motors operatively connected to said fans for driving said propellers.

13. The cooling tower of claim 2 in which said central opening is square and open to the surrounding atmosphere to carry away air discharged through said warm air outlets.

14. The cooling tower of claim 2 in which said central opening is circular and open to the surrounding atmosphere to carry away air discharged through said warm air outlets.

15. The cooling tower of claim 2 in which said warm air outlets are positioned so that discharged air will not be recirculated through said cool air inlets.

16. The cooling tower of claim 2 in which said cells extend completely around so as to enclose the periphery of said central opening.

17. The cooling tower of claim 2 in which said water distribution means is a main pipe leading from said storage basin through a heat source heat exchanger into each of said cells terminating in a series of uniformly spaced, laterally extending feed pipes having spray nozzles evenly disposed along their lengths.

18. The cooling tower of claim 2 in which said perforate fill material is ceramic tiles having cellular structure and arranged vertically in layers in offset fashion so that water showers downwardly through said material rather than flowing directly therethrough.

19. The cooling tower of claim 2 in which said fill support means includes a reinforced concrete framework of columns and beams with lintels spanning said beams to support said perforate fill material.

20. The cooling tower of claim 2 in which said fans are mounted horizontally within each of said cells adjacent said apron portion of said inner wall.

21. The cooling tower of claim 2 in which each of said cells includes a drift eliminator.

* * * * *